United States Patent
Bass et al.

(10) Patent No.: US 6,789,764 B2
(45) Date of Patent: Sep. 14, 2004

(54) DUAL-FLIGHT MODE TANDEM ROTOR WING

(75) Inventors: Steven M. Bass, Highley, AZ (US); Clark A. Mitchell, Chandler, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/253,179

(22) Filed: Sep. 24, 2002

(65) Prior Publication Data

US 2004/0056144 A1 Mar. 25, 2004

(51) Int. Cl.[7] ............................................. B64C 27/22
(52) U.S. Cl. ..................... 244/10; 244/17.11; 244/6; 244/7
(58) Field of Search ...................... 244/6, 7, 10, 17.11, 244/7 A, 17.23

(56) References Cited

U.S. PATENT DOCUMENTS

| | | | | |
|---|---|---|---|---|
| 2,571,566 A | * | 10/1951 | Green ..................... | 244/17.23 |
| 2,650,666 A | * | 9/1953 | Dorand et al. | |
| 2,659,551 A | * | 11/1953 | Campbell ................ | 244/17.23 |
| 2,823,875 A | * | 2/1958 | Peterson .................... | 244/7 A |
| 3,146,970 A | * | 9/1964 | Girard ....................... | 244/7 A |
| 3,159,360 A | * | 12/1964 | Ryan et al. ................ | 244/7 A |
| 3,986,686 A | * | 10/1976 | Girard ....................... | 244/7 A |
| 4,730,795 A | * | 3/1988 | David | |
| 4,770,371 A | * | 9/1988 | Eickmann ................ | 244/7 A |
| 4,793,572 A | * | 12/1988 | Mecca ....................... | 244/7 A |
| 5,454,530 A | * | 10/1995 | Rutherford et al. ........ | 244/7 A |
| 6,050,778 A | * | 4/2000 | McArdle et al. | |
| 6,131,849 A | * | 10/2000 | Nyhus .................... | 244/17.11 |
| 6,161,799 A | * | 12/2000 | Nyhus ....................... | 244/7 A |
| 6,164,590 A | * | 12/2000 | Kusic ..................... | 244/17.11 |
| 6,170,779 B1 | * | 1/2001 | Nyhus ....................... | 244/7 A |
| 6,460,802 B1 | * | 10/2002 | Norris .................... | 244/17.11 |
| 6,467,726 B1 | * | 10/2002 | Hosoda | |

* cited by examiner

Primary Examiner—Michael J. Carone
Assistant Examiner—L. Semunegus
(74) Attorney, Agent, or Firm—David J. Clement

(57) ABSTRACT

A vertical takeoff and landing aircraft (10) is provided including an aircraft fuselage (12). A plurality of hubs (20) are mechanically coupled to the fuselage (12) and are rotated by at least one engine (22). A plurality of tandem rotor/wings (14) are mechanically coupled to the plurality of hubs (20) and propel and lift the aircraft fuselage (12). A transitional lift wing (16) is mechanically coupled to the fuselage (12) and enables lift on the fuselage (12) during off-loading lift of the plurality of tandem rotor/wings (14). A main controller (24) is coupled to the plurality of tandem rotor/wings (14) and switches the plurality of tandem rotor/wings (14) between a vertical lift mode and a fixed wing mode. A method of performing the same is also provided.

24 Claims, 3 Drawing Sheets

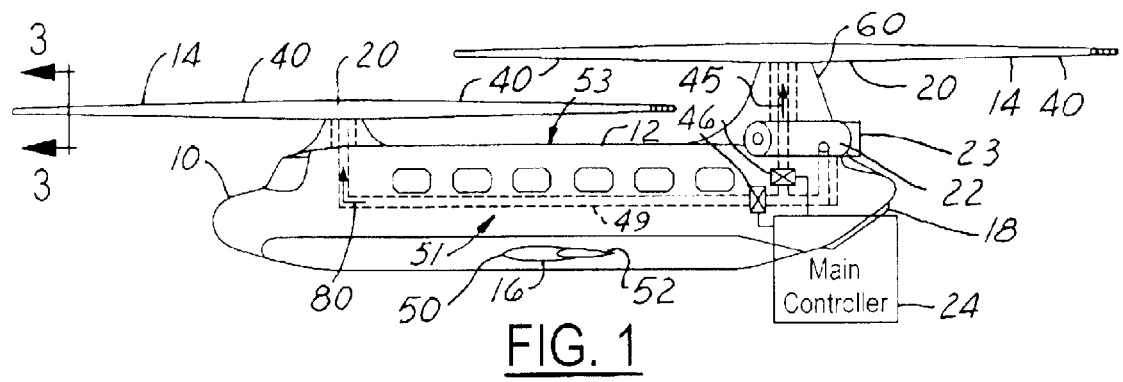
FIG. 1
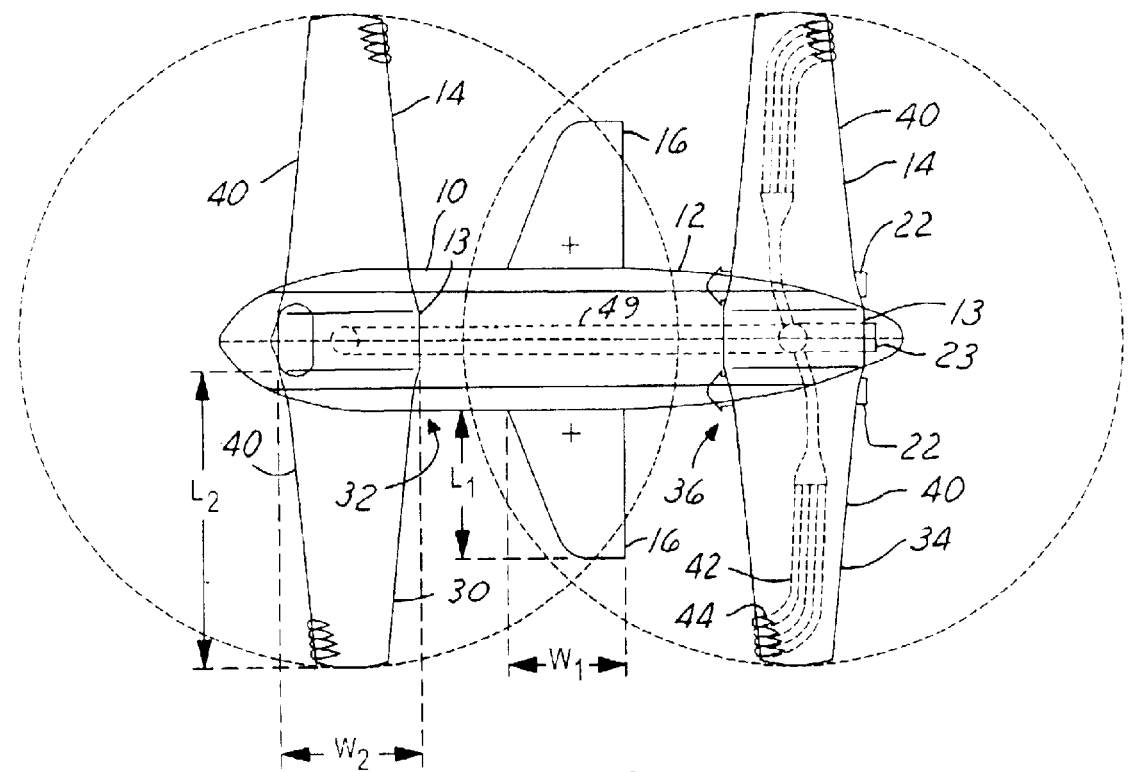
FIG. 2
FIG. 3

DUAL-FLIGHT MODE TANDEM ROTOR WING

TECHNICAL FIELD

The present invention relates generally to aeronautical vehicle systems, and more particularly, to a method and system for providing propulsion and lift to a dual-mode aircraft during a vertical lift mode and a fixed wing mode of flight.

BACKGROUND OF THE INVENTION

Helicopters are versatile aircraft in that they are capable of vertical lift and forward propulsion without need for a runway, unlike most other passenger and cargo transporting style aircraft, such as propeller style airplanes and jet aircraft with a main fixed aircraft lifting wing. Unfortunately, helicopters do have disadvantages that are not generally associated with the other passenger and cargo transporting style aircraft.

One main disadvantage of a helicopter, is a limitation in forward speed. This is a result of significantly increasing power requirements as forward airspeed increases. One factor contributing to the large increase in power requirements is referred to as a "retreating blade stall." During forward flight of the helicopter, a section of a helicopter rotor that is rotating in a rearward direction opposite a flight direction of the helicopter, experiences reversed flow with airspeed being faster than rotational speed of the rotor. Since the airspeed is faster than the rotational speed of the rotor the rotor begins to "stall", in the stated section, and results in a large increase in rotor drag and therefore increased power is required.

Another main contributor to the large increase in power required with increasing airspeed is referred to as an "advancing tip Mach number problem". This is a result of a rotational velocity of a rotor tip, in a direction the helicopter is traveling, experiencing a combination of its rotational velocity in addition to the forward velocity of the helicopter. When the combination of the rotational velocity and the forward velocity exceed a drag divergence Mach number of a corresponding airfoil of the rotor, a large increase in drag is experienced.

The retreating blade stall and the advancing tip Mach number factors are additive and impact power required by the rotor in approximately the same helicopter forward speed regime. These two factors in combination with other lesser contributing factors known in the art, result in limiting forward speed of a helicopter to a speed which is less than a forward speed that is attainable by conventional fixed wing aircraft.

In order to have vertical takeoff and landing capability of a helicopter and to have forward flight speed ability of other aircraft, different styles of vertical takeoff and landing (VTOL) aircraft are being introduced and becoming more abundant. Generally, dual flight mode VTOL aircraft takeoff as a helicopter with dual rotating rotors providing lift in a vertical direction.

Dual flight mode propellered VTOL aircraft typically have a main rotational unit that extends perpendicular to and across an aircraft body. The main rotational unit includes dual rotors and a main lift wing. During takeoff the dual rotors are directed in a vertical direction to provide lift, similar to that of a helicopter. When the VTOL aircraft has obtained a certain altitude and forward flight speed the main rotational unit is rotated such that the rotors act as propellers and provide forward thrust and the main lift wing provides vertical lift.

Current propellered VTOL aircraft although providing versatility of a helicopter and increased forward speed are, unfortunately, still limited in forward speed, lifting or cargo carrying capability, and center of gravity travel.

Other dual flight VTOL aircraft also exist and are sometimes referred to as direct lift or jet powered lift dual flight VTOL aircraft. The direct lift VTOL aircraft exhibit high disc loading and require prepared landing surfaces such as concrete or asphalt. The direct lift. VTOL aircraft are also limited in center of gravity travel and are typically not designed to carry large amounts of cargo.

To overcome the forward speed limitation of traditional VTOL aircraft a canard rotor/wing design (U.S. Pat. No. 5,454,530) has been introduced. The canard rotor/wing design includes a single wing centrally located on an aircraft fuselage that may be operated in a helicopter mode and in a fixed wing mode. The wing includes two symmetrical blades and operates irrespective of flow direction. The conard rotor/wing design although providing increased forward speed over more traditional VTOL aircraft is limited in cargo carrying capability and has limited center of gravity travel capability. The canard rotor wing configuration does not provide for packaging, of a large cargo compartment. The travel capability of the center of gravity for the canard rotor wing aircraft is limited since the canard rotor wing has a single lift point for vertical lift, similar to a helicopter.

It is therefore, desirable to provide a VTOL aircraft with increased performance including increased cargo carrying capabilities and increased center of gravity travel capability as compared to current VTOL aircraft.

SUMMARY OF THE INVENTION

The present invention provides a method and system for providing propulsion and lift to a dual-mode aircraft during a vertical lift mode and a fixed wing mode of flight. A vertical takeoff and landing aircraft is provided including an aircraft fuselage. A plurality of hubs are mechanically coupled to the fuselage and are rotated by at least one engine. A plurality of tandem rotor/wings are mechanically coupled to the plurality of hubs and propel and lift the fuselage. A transitional lift wing is mechanically coupled to the fuselage and enables lift of the fuselage during off-loading lift of the plurality of tandem rotor/wings. A main controller is coupled to the plurality of tandem rotor/wings and switches the plurality of tandem rotor/wings between a vertical lift mode and a fixed wing mode. A method of performing the same is also provided.

The present invention has several advantages over existing VTOL aircraft. One advantage of the present invention is that it is capable of carrying large amounts of cargo with increased payload weight at fixed-wing aircraft speeds and has the capability of a VTOL aircraft.

Another advantage of the present invention is that it provides configuration versatility for various applications having differing performance requirements.

Furthermore, the present invention provides an aircraft that has multiple tandem rotor wings that are fixed during a fixed wing mode providing increased survivability in military applications.

Moreover, the present invention provides an aircraft with increased center of gravity travel capability due to the use of multiple tandem rotor wings.

The present invention itself, together with further objects and attendant advantages, will be best understood by reference to the following detailed description, taken in conjunction with the accompanying drawing.

BRIEF DESCRIPTION OF THE DRAWINGS

FIG. 1 is a side view of a vertical takeoff and landing (VTOL) aircraft utilizing a tandem rotor/wing configuration in accordance with an embodiment of the present invention;

FIG. 2 is a top view of the VTOL aircraft in accordance with an embodiment of the present invention;

FIG. 3 is a cross-sectional view of a tandem rotor/wing in accordance with an embodiment of the present invention;

DETAILED DESCRIPTION OF THE PREFERRED EMBODIMENT

Figure 4:
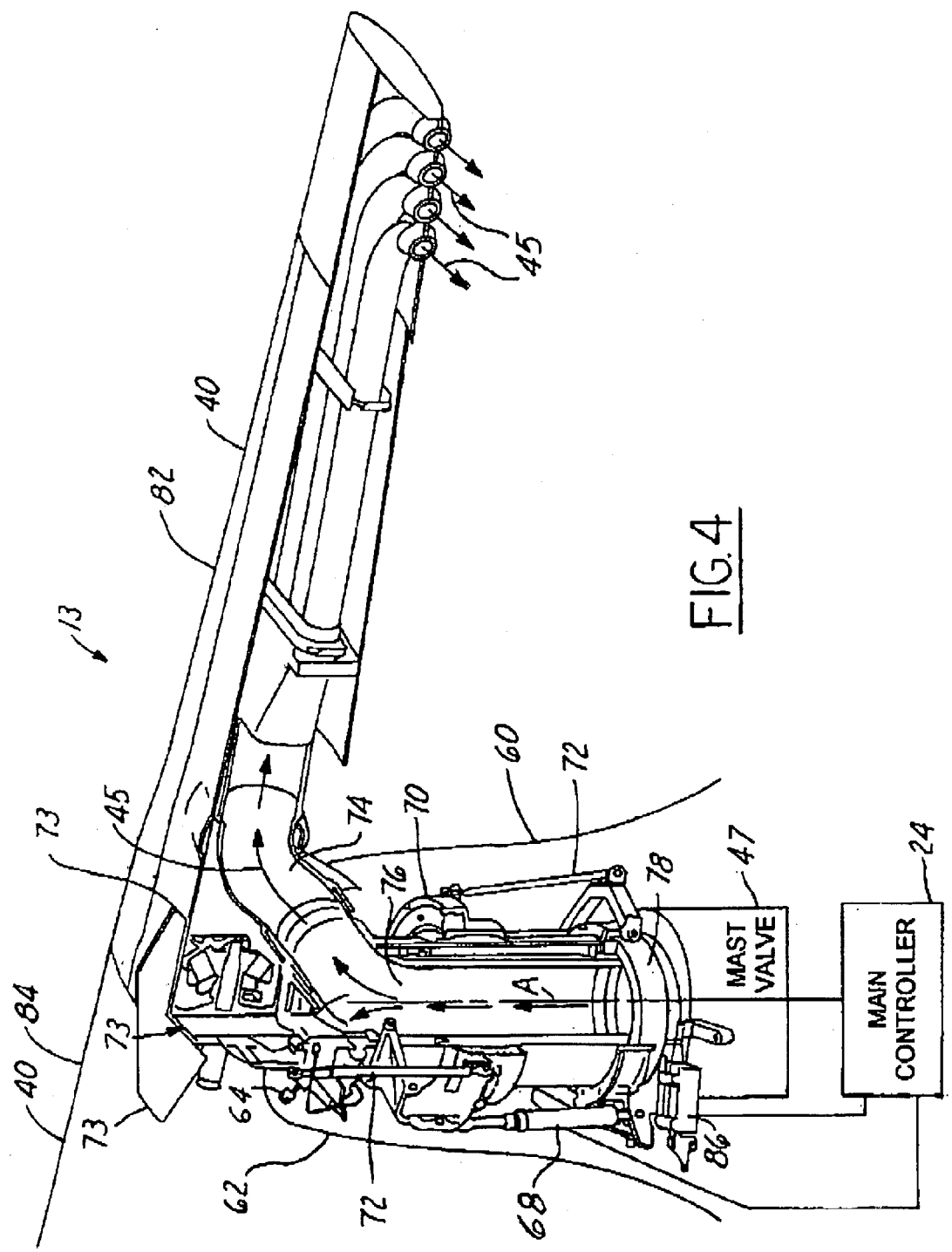
FIG. 4 is a cutaway perspective view of a rotor/wing hub assembly and pylon in accordance with an embodiment of the present invention.

In each of the following figures, the same reference numerals are used to refer to the same components. While the present invention is described with respect to a method and system for providing propulsion and lift to a dual-mode aircraft during a vertical lift mode and a fixed wing mode of flight, the present invention may be adapted for various applications and systems known in the art.

In the following description, various operating parameters and components are described for one constructed embodiment. These specific parameters and components are included as examples and are not meant to be limiting.

Referring now to FIGS. 1 and 2, a side view and a top view of a vertical takeoff and landing (VTOL) aircraft 10 utilizing a tandem rotor/wing configuration in accordance with an embodiment of the present invention are shown. The aircraft 10 includes a fuselage 12, multiple rotor/wing hub assemblies 13 including multiple tandem rotor/wings 14, and a transitional lift wing 16. The fuselage 12 is capable of carrying large loads that may be loaded through a rear cargo door 18. The rotor/wings 14 are mechanically coupled to the fuselage 12 via hubs 20, which are rotated by one or more turbofan engines 22 having engine nozzles 23. The rotor/wings 14 propel and provide lift for the aircraft 10. The rotor/wings 14 operate in dual modes including a vertical lift mode and a fixed wing mode, in conjunction with the engines 22 providing takeoff, landing, and lower speed flight and hover capabilities of a helicopter and forward high speed thrust and lift capabilities of a fixed wing aircraft such as a jet aircraft. As the rotor/wings 14 are transitioned from the vertical lift mode to the fixed wing mode the transitional lift wing 16 provides lift to the aircraft 10. A main controller 24 is coupled to the rotor/wings 14 and switches between the vertical lift mode and the fixed wing mode. Although, two tandem rotor/wings 14 and a single transitional fixed wing 16 are shown additional rotor/wings and fixed wings may be incorporated.

In a preferred embodiment of the present invention a first tandem rotor/wing 30 is located in a forward portion 32 of the aircraft 10 and a second tandem rotor/wing 34 is located behind the first rotor/wing, 30 and in a rearward portion 36 of the aircraft 10, as shown. The first rotor/wing 30 is vertically in a lower location relative to the second rotor/wing 34 to avoid interference during vertical lift mode. The transitional lift wing 16 is located between the first rotor/wing 30 and the second rotor/wing 34 on the fuselage 12. The transitional lift wing 16 is vertically in a lower location relative to both the first rotor/wing 30 and the second rotor/wing 34 to provide central lift of the aircraft 10 and to also avoid interference with the rotor/wings 30 and 34.

The rotor/wings 14 include multiple blades 40 that have one or more flow ducts 42 extending therethrough and serving as an exhaust transport between the engines 22 and exit nozzles 44 during the vertical lift mode. Exhaust gases 45 from the engines 22 are combined and distributed to the flow ducts 42. The exhaust gases from the engines 22 flow to both the first rotor/wing 30 and the second rotor wing 34. The first rotor/wing 30 receives the exhaust gases 45 via a transport duct 49 extending between the rotor/wings 14 along the fuselage 12. Although, the transport duct 49 is shown as extending through a middle portion 51 of the fuselage 12, the transport duct may be in order locations and is preferably along a top portion 53 of the fuselage. The flow ducts 42 are closed during the fixed wing mode and exhaust gases 45 are diverted from entering the rotor/wings 14, via exhaust duct valves 46. A mast valve 47 is utilized to divert the exhaust gases 45 from entering the rotor/wings 14. The mast valve 47 is coupled to and controlled by the main controller 24. Although, the mast valve 47 is used other valves known in the art may be utilized. For example, exit nozzle valves, not shown, may be used near the exit nozzles 44, which may be more efficient than the mast valve 47. The exhaust gases 45 are then directed to engine nozzle 23 in stead of exit nozzles 44.

The rotor/wings 14 and the transitional lift wing 16 may have a leading or trailing edge device such as a flap, a slat, a flaperon, an aileron, a split aileron or other leading or trailing edge device, known in the art, to provide control forces and moments during flight.

Although, the engines 22 are located in a rearward portion 36 of the aircraft 10, below the second rotor/wing 34, they may be located in other locations on the aircraft 10. For example, the engines 22 may be located between the first rotor/wing 30 and the second rotor/wing 34 above the transitional lift wing 16. Also, the turbofan engines 22 are for example purposes only, other engines known in the art may be utilized.

The main controller 24 is preferably microprocessor based such as a computer having a central processing unit, memory (RAM and/or ROM), and associated input and output buses. The main controller 24 may be a portion of a central vehicle main control unit, an interactive vehicle dynamics module, a main safety controller, or be a stand-alone controller as shown.

Referring now also to FIG. 3, a cross-sectional view of the tandem rotor/wings 14 in accordance with an embodiment of the present invention is shown. Although, the rotor/wings 14 are symmetrical and approximately elliptical in cross-sectional shape in a forward and aft direction, the rotor/wings 14 may include other aerodynamic flow control efficiency technologies to alter the shape of the rotor/wings 14. The other aerodynamic flow control efficiency technologies may include circulation control flowing devices, smart materials, micro flow control devices, zero mass jets, or other rotor/wing shape altering features known in the art.

The cross-sectional shape of the rotor/wings 14 allows the rotor/wings 14 to operate effectively irrespective of flow direction.

The cross-sectional shape of the rotor/wings 14 is unlike that of the transitional lift wing 16, which has a more traditional airfoil member shape with a more rounded leading edge 50 and a sharper trailing edge 52. The transitional lift wing 16 has generally a larger width $W_1$ and a shorter length $L_1$ than the rotor/wings 14, which have width $W_2$ and length $L_2$. Of course, the sizes, shapes, and relational sizes and shapes of the rotor/wings 14 and the transitional lift wing 16 may be altered to satisfy various applications.

Referring now to FIG. 4, a cutaway perspective view of the rotor/wing hub assemblies 13 and a pylon 60 in accordance with an embodiment of the present invention is shown. The pylon 60 couples the hub assembly 13 to the fuselage 12, in a fixed position, and has a pylon fairing 62 enclosing a majority of aircraft components coupled between the hub 20 and the fuselage 12 therein. The main controller 24 may also be located within the fairing 62. The hub assembly 13 includes the hub 20, which is of a gimbaling teetering type to allow flapping degrees of freedom. The hub 20 may have a rigid rotor/wing configuration in which the hub 20 is not gimbaled and is locked in a predetermined position. The rotor/wing 14 although having flapping degrees of freedom is limited in flapping displacement due to variable dampers 64, only one damper 64 is shown, to prevent contact between rotor/wings 14 during vertical lift mode.

The main controller 24 is electrically coupled to hydraulic actuators 68 that are coupled to a swashplate 70 and adjust pitch of the blades 40 through links 72, within the pylon fairing 62. Although, one hydraulic actuator is shown two other hydraulic actuators exist approximately 120° apart about a center axis A. Feather hinges 73 are mechanically coupled the blades 40 to the hubs 20 and further allow for pitch adjustment of the blades 40. Two feather hinges 73 exist for each blade 40. The swashplate 70 provides a mechanism as to which control commands may be transferred between a non-rotating device and a rotating device, such as the blades 40. Pitch, roll, and yaw control are achieved by adjusting cyclic and collective pitch on each of the blades 40, similar to other existing helicopters. Other pitch altering devices other than the feathering hinges 73 and the swashplate 70 may be used to generate aerodynamic forces and moments on the blades 40 such as blade actuators, which are not shown.

Also shown in further detail, are the ducts 42, which are coupled to a transition duct 74 and then to a main duct 76. The main duct 76 is located within a mast 78 and splits the exhaust gases 45 between a first blade 82 and a second blade 84. The exhaust gases 45 exit the nozzles 44 and cause the blades 82 and 84 to rotate during the vertical lift mode.

The main controller 24 is also coupled to a locking mechanism 86, which is further coupled to the mast 78. The main controller 24, during the fixed wing mode, locks the mast 78 to the fuselage 12 and prevents the blades 82 and 84 from rotating.

Figure 5:
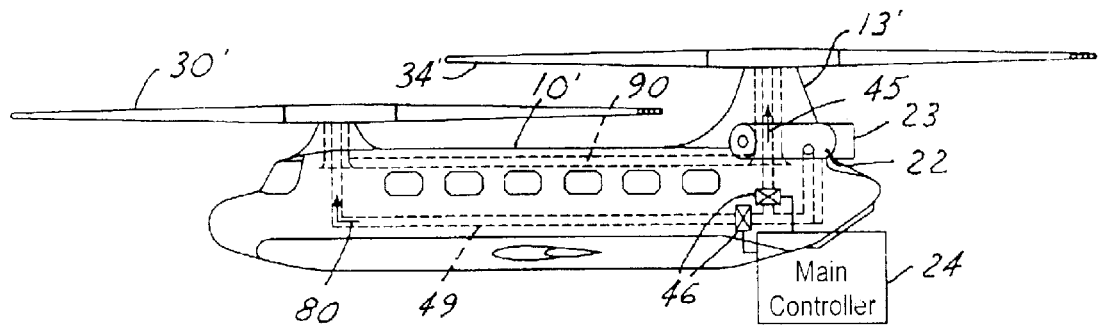
FIG. 5 is a side view of the VTOL aircraft utilizing a synchronization shaft configuration in accordance with another embodiment of the present invention.

Referring now to FIG. 5, a side view of a VTOL aircraft 10' utilizing a synchronization shaft configuration in accordance with another embodiment of the present invention is shown. A synchronization shaft 90 is coupled to rotor/wing hub assemblies 13' to prevent rotational interaction between a first rotor/wing 30' and a second rotor/wing 34'. To further prevent interaction of the rotor/wings 30' and 34' the first rotor/wing 30' is mechanically coupled to the second rotor/wing 34' via the synchronization shaft 90. The synchronization shaft 90 prevents the rotor/wings 30' and 34' from overlapping and potentially interacting. The synchronization shaft configuration potentially allows for increased flapping degrees of freedom blades 40', since overlapping is prevented.

Figure 6:
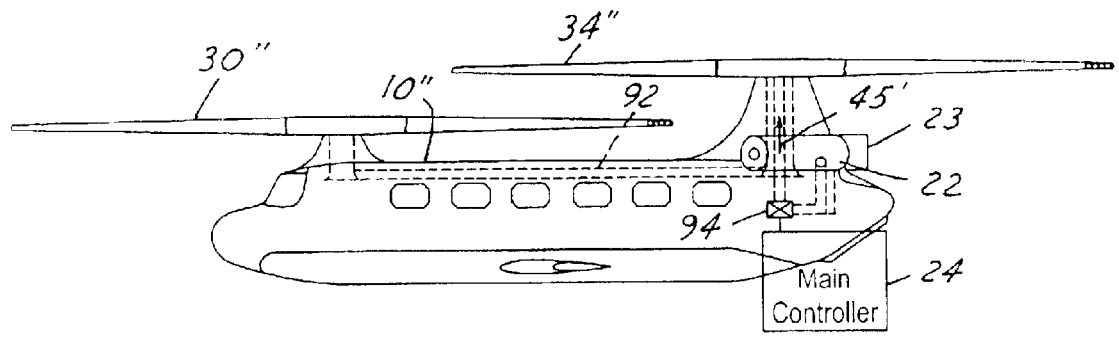
FIG. 6 is a side view of the VTOL aircraft utilizing a driveshaft configuration in accordance with yet another embodiment of the present invention.

Referring now to FIG. 6, a side view of a VTOL aircraft 10" utilizing a driveshaft configuration in accordance with yet another embodiment of the present invention is shown. The exhaust gases 45' are combined, similar to the exhaust gases 45 in the configurations of FIGS. 1 and 5, and are directed to and cause a second tandem rotor/wing 34" to rotate, instead of being distributed to both a first rotor/wing 30 and a second rotor/wing 34 as in the embodiments of FIGS. 1 and 5. A driveshaft 92 is mechanically coupled to a first tandem rotor/wing 30" and to the second tandem rotor/wing 34". The driveshaft 92 rotates the first tandem rotor/wing 30" in response to rotation of the second tandem rotor/wing 34" such that the second tandem rotor/wing 34" performs as a primary rotor and the first tandem rotor/wing 30" performs as a secondary rotor. A single exhaust duct valve 94 is utilized to allow the exhaust gases 45' to flow through the second rotor/wing 34". Unlike the embodiments of FIGS. 1 and 5, ductwork does not exist between the engines 22 and the first rotor/wing 30" or within the first rotor/wing 30". Thus, the first rotor/wing 30" is mechanically rotated by the driveshaft 92 and not directly by the exhaust gases 45'. The drive shaft configuration simplifies amount of exhaust ductwork and reduces amount of exhaust duct valves and also allows for more aerodynamic cross-section of the rotor wing 30", since the rotor wing 30" does not have to accommodate the exhaust gases 45'.

Figure 7:
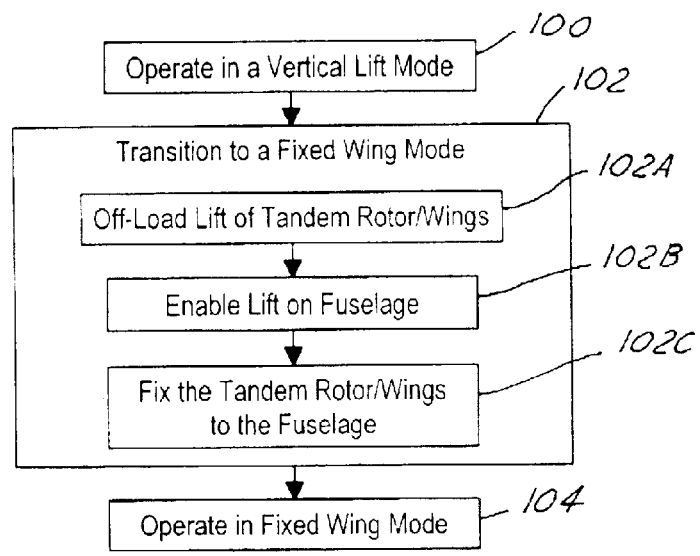
FIG. 7 is a logic flow diagram illustrating a method of propelling and lifting an aircraft in accordance with an embodiment of the present invention.

Referring now to FIG. 7, a logic flow diagram illustrating a method of propelling and lifting the aircraft 10 in accordance with an embodiment of the present invention is shown.

In step 100, the aircraft 10 is operated in a vertical lift mode to generate vertical lift on the fuselage 12. During vertical lift mode the rotor/wings 14 are free to rotate similar to a helicopter. Exhaust gases 45 are allowed to flow from the engines 22 through the blades 40 and exit the nozzles 44 as to rotate the blades 40.

In step 102, the main controller 24 switches the aircraft 10 from operating in the vertical lift mode to operating in the fixed wing mode.

In step 102A, the main controller 24 begins off-loading lift of the rotor/wings 14, thus reducing rotational speed of the rotor/wings 14. The valves 46 are gradually closed to prevent exhaust gases 45 from entering the ducts 42 and the exhaust gases 45 are redirected to exit engine nozzles 23, to generate forward thrust.

In step 102B, as the main controller 24 is off-loading lift of the rotor/wings 14, the transitional lift wing 16 is enabling lift on the fuselage 12.

In step 102C, when the rotor/wings 14 have come to an approximate stop, the rotor/wings 14 are laterally fixed to the fuselage 12, via the locking mechanism 86. The gimbaling freedom of the rotor/wings 14 is locked and the feathering hinges 73 are locked out such that the rotor/wings 14 do not have flapping degrees of freedom.

In step 104, the aircraft 10 is operated in the fixed wing mode. The aircraft is capable of transitioning from the fixed wing mode to the vertical lift mode and therefore may return to step 100.

The above-described steps, are meant to be an illustrative example, the steps may be performed synchronously, continuously, or, in a different order depending upon the application.

The present invention by providing multiple tandem rotor/wings and distributed load among the rotor/wings in combination with a transitional fixed wing provides a VTOL aircraft with increased payload capability and potentially longer range of flight over prior VTOL aircraft.

The above-described apparatus and method, to one skilled in the art, is capable of being adapted for various applications and systems known in the art. The above-described invention can also be varied without deviating from the true scope of the invention.

What is claimed is:

1. A vertical takeoff and landing aircraft comprising:
   an aircraft fuselage;
   a plurality of hubs mechanically coupled to said fuselage and rotated by at least one engine;
   a plurality of tandem rotor/wings mechanically coupled to said plurality of hubs and propelling and lifting said aircraft fuselage;
   at least one transitional lift wing mechanically coupled to said fuselage and enabling lift of said aircraft fuselage during off-loading lift of said plurality of tandem rotor/wings; and
   a main controller coupled to said plurality of tandem rotor/wings and switching said plurality of tandem rotor/wings between a vertical lift mode and a fixed wing mode.

2. An aircraft as in claim 1 further comprising a plurality of fixed pylons coupled between said fuselage and said plurality of hubs.

3. An aircraft as in claim 1 wherein said at least one transitional lift wing is mechanically coupled between said plurality of tandem rotor/wings to said fuselage.

4. An aircraft as in claim 1 wherein said plurality of tandem rotor/wing comprise at least one leading or trailing edge device selected from at least one of a flap, a slat, a flaperon, an aileron, and a split aileron.

5. An aircraft as in claim 1 wherein said at least one transitional lift wing comprises at least one leading or trailing edge device selected from at least one of a flap, a slat, a flaperon, an aileron, and a split aileron.

6. An aircraft as in claim 1 wherein said plurality of tandem rotor/wings rotate during said vertical lift mode and are fixed during said fixed wing mode.

7. An aircraft as in claim 1 wherein said plurality of tandem rotor/wings comprise a plurality of blades.

8. An aircraft as in claim 7 wherein said plurality of blades comprise at least one flow duct.

9. An aircraft as in claim 8 wherein said at least one flow duct serves as an exhaust transport between said at least one engine and at least one exit nozzle during said vertical lift mode.

10. An aircraft as in claim 8 wherein said at least one flow duct is closed during said fixed wing mode and exhaust gases are diverted from entering said plurality of tandem rotor/wings.

11. An aircraft as in claim 8 wherein exhaust gases from said at least one engine are combined and distributed to said at least one flow duct.

12. An aircraft as in claim 7 further comprising hydraulic actuators coupled to and adjusting pitch of said plurality of blades.

13. An aircraft as in claim 12 further comprising at least one pitch altering device coupled to said plurality of blades and said hydraulic actuators adjusting pitch of said plurality of blades.

14. An aircraft as in claim 13 wherein said at least one pitch altering devices is selected from at least one of a feathering hinge, a swashplate, and a blade actuator.

15. An aircraft as in claim 12 wherein said hydraulic actuators are coupled to said plurality of hubs within a pylon fairing.

16. An aircraft as in claim 1 further comprising a synchronization shaft coupling said plurality of tandem rotor/wings.

17. An aircraft as in claim 1 wherein said at least one engine produces exhaust gases, said exhaust gases are combined and directed to and cause a second tandem rotor/wing to rotate, and further comprising a driveshaft mechanically coupling said first tandem rotor/wing to a second tandem rotor/wing, said driveshaft rotating said first tandem rotor/wing in response to rotation of said second tandem rotor/wing.

18. An aircraft as in claim 1 wherein said plurality of hubs are gimbaled.

19. An aircraft as in claim 1 wherein said plurality of hubs have a rigid rotor/wing configuration.

20. An aircraft as in claim 1 wherein said plurality of tandem rotor/wings are approximately symmetrical in shape.

21. An aircraft as in claim 1 wherein said plurality of tandem rotor/wings comprise at least one rotor/wing shape altering feature.

22. An aircraft as in claim 1 where in a cross-section of said plurality of tandem rotor/wings is approximately elliptical in shape.

23. A method of propelling and lifting an aircraft comprising:
   (A) operating in a vertical lift mode to generate vertical lift on an aircraft fuselage comprising;
      rotating a plurality of tandem rotor/wings; and
   (B) switching between a vertical lift mode and a fixed wing mode comprising;
      off-loading lift of said plurality of tandem rotor/wings;
      enabling lift of said aircraft fuselage during said off-loading; and
      laterally fixing said plurality of tandem rotor/wings.

24. A vertical takeoff and landing aircraft comprising:
   an aircraft fuselage;
   a plurality of hubs mechanically coupled to said fuselage and rotated by at least one engine;
   a plurality of tandem rotor/wings mechanically coupled to said plurality of hubs and propelling and lifting said aircraft fuselage, said plurality of tandem rotor/wings rotate during a vertical lift mode and are fixed during a fixed wing mode;
   at least one transitional lift wing mechanically coupled to said fuselage and between said plurality of tandem rotor/wings and enabling lift of said aircraft fuselage during off-loading lift of said plurality of tandem rotor/wings; and
   a main controller coupled to said plurality of tandem rotor/wings and switching said plurality of tandem rotor/wings between said vertical lift mode and said fixed wing mode.

* * * * *